United States Patent
Spandley et al.

(10) Patent No.: US 11,225,947 B2
(45) Date of Patent: Jan. 18, 2022

(54) METHOD OF SECURING CABLES TO A WIND TURBINE BLADE

(71) Applicant: Vestas Wind Systems A/S, Aarhus N. (DK)

(72) Inventors: Luke Spandley, Ventnor (GB); Paul Badger, Salisbury (GB); Stephen Buggy, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 427 days.

(21) Appl. No.: 16/306,994

(22) PCT Filed: Jun. 12, 2017

(86) PCT No.: PCT/DK2017/050192
§ 371 (c)(1),
(2) Date: Dec. 4, 2018

(87) PCT Pub. No.: WO2017/220096
PCT Pub. Date: Dec. 28, 2017

(65) Prior Publication Data
US 2020/0309095 A1 Oct. 1, 2020

(30) Foreign Application Priority Data
Jun. 20, 2016 (DK) .......................... PA 2016 70443

(51) Int. Cl.
*F03D 13/00* (2016.01)
*F03D 1/06* (2006.01)
(52) U.S. Cl.
CPC ........... *F03D 13/00* (2016.05); *F03D 1/0675* (2013.01)
(58) Field of Classification Search
CPC ......... F03D 1/0675; F03D 80/85; F03D 13/00
See application file for complete search history.

(56) References Cited

U.S. PATENT DOCUMENTS

| 2011/0142644 A1 | 6/2011 | Fritz et al. |
| 2011/0243737 A1 | 10/2011 | Bell et al. |
| 2015/0204311 A1 | 7/2015 | Clemens |

FOREIGN PATENT DOCUMENTS

| CN | 101793240 A | 8/2010 |
| CN | 102678442 A | 9/2012 |

(Continued)

OTHER PUBLICATIONS

European Patent Office, International Search Report and Written Opinion in PCT Application No. PCT/DK2017/050192, dated Aug. 25, 2017.

(Continued)

*Primary Examiner* — Moshe Wilensky
(74) *Attorney, Agent, or Firm* — Wood Herron & Evans LLP

(57) ABSTRACT

A method of securing a cable (22) to a wind turbine blade is described. The method involves providing a pre-assembled cable assembly (34) comprising a cable (22) and a plurality of mounts (40a-e) pre-attached to the cable (22) at intervals along the length of the cable (22). The plurality of mounts (40a-e) is attached to a surface (20) of a wind turbine blade such that the mounts (40a-e) are spaced apart along the surface (20) of the blade. The spacing between adjacent mounts (40a-e) when the mounts (40a-e) are attached to the blade is less than the length of the cable (22) between said adjacent mounts (40a-e) such that a predetermined amount of slack is provided in the cable (22) between said adjacent mounts (40a-e). A pre-assembled cable assembly for use in the method is also described together with a method of assembling the cable assembly.

11 Claims, 4 Drawing Sheets

(56) References Cited

FOREIGN PATENT DOCUMENTS

| | | |
|---|---|---|
| DK | 9800009 U3 | 10/1998 |
| DK | 200201873 A | 10/2003 |
| EP | 2484897 A1 | 8/2012 |
| EP | 3093487 A1 | 11/2016 |
| GB | 2485595 A | 5/2012 |
| WO | 0079128 A1 | 12/2000 |

OTHER PUBLICATIONS

Danish Patent and Trademark Office, Search and Examination Report in PA 2016 70443, dated Jan. 23, 2017.
China National Intellectual Property Administration, First Notification of Office Action in CN Application No. 201780045426.0, dated Nov. 1, 209.

METHOD OF SECURING CABLES TO A WIND TURBINE BLADE

TECHNICAL FIELD

The present invention relates to a method of securing cables to a wind turbine blade and to an associated cable assembly.

BACKGROUND

Modern wind turbine blades may incorporate a variety of electrical components within the blade. Such components include heating elements for use in de-icing or anti-icing systems, illumination elements and sensors, for example. These components may be connected to the electrical system of the wind turbine by cables that extend inside the blade. The cables are typically secured to the inner surface of the blade shell.

When securing the cables to the blade, it is desirable to include some slack in the cables to prevent the cables from stretching or otherwise becoming strained or damaged during flexing of the blade in use. It is important to ensure an appropriate amount of slack when installing the cables: too little slack may leave the cables susceptible to damage, whilst too much slack may result in the cables flapping inside the blade, which may also result in damage to the cables or to other components inside the blade. Too much slack also unnecessarily increases the length of cable inside the blade, leading to an increased cost and weight of the blade.

Ensuring a suitable amount of slack in the cable can be complicated and time-consuming during the blade manufacturing process, and relies upon the cable installer accurately measuring lengths of cable during installation. As well as being complicated, this also introduces a risk of human error during the installation process.

Against this background it is an object of the present invention to provide an improved process for installing cables in a wind turbine blade.

SUMMARY OF THE INVENTION

According to an aspect of the present invention, there is provided a method of securing a cable to a wind turbine blade. The method may comprise providing a pre-assembled cable assembly comprising a cable and a plurality of mounts pre-attached to the cable at intervals along the length of the cable. The method may further comprise attaching the plurality of mounts to a surface of a wind turbine blade such that the mounts are spaced apart along the surface of the blade. The spacing between adjacent mounts when the mounts are attached to the blade is preferably less than the length of the cable between said adjacent mounts such that a predetermined amount of slack is provided in the cable between said adjacent mounts.

This aspect of the invention provides a particularly quick and advantageous method of securing a cable to a wind turbine blade. By pre-assembling the cable assembly, the correct amount of slack may be incorporated into the cable offline. The cable assembly can then be installed quickly and efficiently during the blade fabrication process. Furthermore, the likelihood of human error during the fabrication process is reduced.

The pre-assembled cable assembly may comprise a tension cord pre-attached to the plurality of mounts. The tension cord is preferably substantially inextensible. In preferred embodiments the tension cord may advantageously be made of a non-metallic material. This ensures that the tension cord does not interfere with the electrical cable or any lightning protection systems incorporated in the blade.

The length of the tension cord between adjacent mounts may advantageously define the spacing between adjacent mounts. Accordingly, the length of the tension cord between adjacent mounts is preferably less than the length of the cable between said adjacent mounts. In certain embodiments, the tension cord may comprise a plurality of sections connected respectively between adjacent mounts. The length of each section is preferably less than the length of the cable between the adjacent mounts.

The tension cord is an advantageous addition to the cable assembly, in that it may prevent the cable from being stretched or strained during transportation, installation and use. As the tension cord is preferably substantially inextensible and shorter than the length of the cables between adjacent mounts, the tension cord may be pulled taut during installation of the cable assembly without any strain being placed upon the cable. Pulling the tension cable taut results in the mounts being arranged with suitable predefined spacings between mounts on the blade surface, whilst a predetermined amount of slack is ensured in the cable between the mounts.

The method of securing a cable to a wind turbine blade may initially comprise fixing an end of the tension cord to an attachment point. The mounting point may be a point defined on the blade surface, on a blade mould supporting the blade, or at another fixed location. The method may further comprise maintaining tension in the tension cord prior to attaching the mounts to the surface of the blade.

If desirable, the method may comprise detaching the tension cord from the mounts and/or severing the tension cord between adjacent mounts after attaching the mounts to the surface of the blade. This relieves any tension on the mounts once the mounts have been attached to the blade. However, in certain embodiments it may not be required to detach or sever the tension cord, and it may remain in place after installation of the cable assembly.

The method optionally comprises providing a template on the surface of the blade indicating a plurality of mounting positions respectively for the plurality of mounts. The template serves as a useful guide for indicating the mounting positions for the mounts and may facilitate the cable installation process.

In certain embodiments, the provision of a template may avoid the need for a tension cord. For example, if the tension cord is omitted, then the method may comprise pre-attaching the mounts to the cable with spacings between mounts that are greater than an intended spacing between the mounts when the mounts are attached to the blade. Thereafter, during installation of the cable assembly, the method may comprise providing a template on the surface of the blade indicating a plurality of intended mounting positions respectively for the plurality of mounts, wherein the spacing between adjacent mounting positions is less that than the length of cable between said adjacent mounts.

The method may comprise projecting the template onto the surface of the blade. For example, the template may be laser-projected onto the surface of the blade.

Alternatively, the mounting positions may be marked on the surface of the blade by other means, for example using a permanent or non-permanent marking device. This may be achieved relatively simply using pen and ink, or the mounting positions may be printed on the surface of the blade.

The pre-assembled cable assembly may be coiled on a cable drum. This provides a convenient means of storing and transporting the cable assembly. It also facilitates the installation process, which may therefore involve uncoiling the cable assembly across the surface of the blade.

The step of attaching the mounts to the surface of the blade may comprise adhesively bonding the mounts to the surface of the blade. Alternatively the mounts could be attached using other fixing means, for example using screws or rivets. Adhesive is preferred for its convenience. In certain embodiments, double-sided adhesive tape may be pre-applied to the base of each mount. The adhesive may be pressure-sensitive, so the method of attaching the mounts may simply involve pressing the mounts into contact with the blade surface.

According to another aspect of the invention, there is provided a pre-assembled cable assembly for use in a method of securing a cable to a wind turbine blade, the cable assembly comprising a cable and a plurality of mounts pre-attached to the cable at intervals along the length of the cable.

The pre-assembled cable assembly may comprise a tension cord attached to the plurality of mounts. The length of the tension cord between adjacent mounts is preferably less than the length of the cable between said adjacent mounts. As discussed previously, the cable assembly may conveniently be coiled on a cable drum.

According to another aspect of the invention, there is provided a wind turbine blade comprising a cable assembly as described above attached to a surface of the blade.

According to a further aspect of the present invention, there is provided a method of assembling a cable assembly. The method may comprise: providing a cable; attaching a plurality of mounts to the cable at intervals along the length of the cable; and attaching a tension cord to the plurality of mounts. The length of the tension cord between adjacent mounts may be less than the length of the cable between adjacent mounts such that a predefined amount of slack is provided in the cables between adjacent mounts.

In any of the aspects discussed above, and/or in any of the examples discussed later, the cable assembly may comprise a plurality of cables.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. Repetition of optional features in the above description is avoided purely for reasons of conciseness.

BRIEF DESCRIPTION OF THE DRAWINGS

Embodiments of the invention will now be described, by way of example only, with reference to the accompanying drawings, in which.

DETAILED DESCRIPTION

Figure 1:
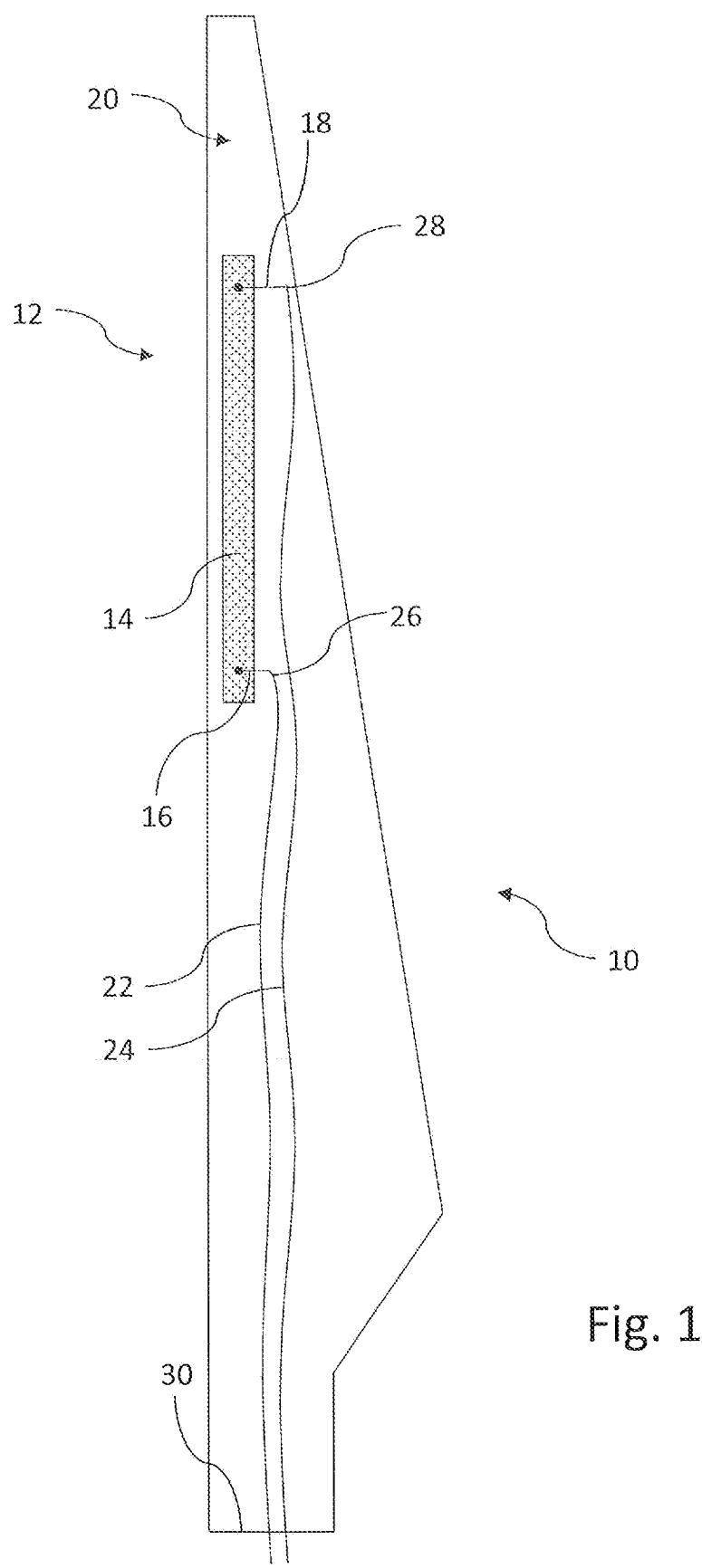
FIG. 1 is a schematic, plan view of a wind turbine blade shell showing cables extending inside the blade and connected to a blade heating system.

FIG. 1 shows a wind turbine blade half-shell 10 incorporating an anti-ice system 12. The anti-ice system 12 comprises a plurality of electro-thermal heating elements 14, one of which is shown in FIG. 1. Each heating element 14 is configured to warm an area of an outer surface (not shown) of the blade to prevent ice from forming in the heated area.

The electro-thermal heating element 14 is embedded within the laminate structure of the half-shell 10. Electrical connectors 16, 18 connect to the electro-thermal heating element 14 and extend from the embedded heating element 14 to an inner surface 20 of the half-shell 10. A pair of electrical cables 22, 24 is provided inside the blade for supplying power to the heating element 14. A first end 26, 28 of each cable 22, 24 is connected to a respective electrode 16, 18.

When the wind turbine blade is installed on a wind turbine hub, a second end (not shown) of each cable 22, 24 is connected to a power distribution box (not shown) located at the root end of the blade. In turn, the power distribution box is connected to the wind turbine's auxiliary power system (not shown).

The cables 22, 24 are secured to the inner surface 20 of the blade shell 10 during installation of the cables 22, 24 as part of the blade manufacturing process. A method of securing the cables 22, 24 using a pre-assembled cable assembly will now be described with reference to FIGS. 2, 3 and 4.

Figure 2:
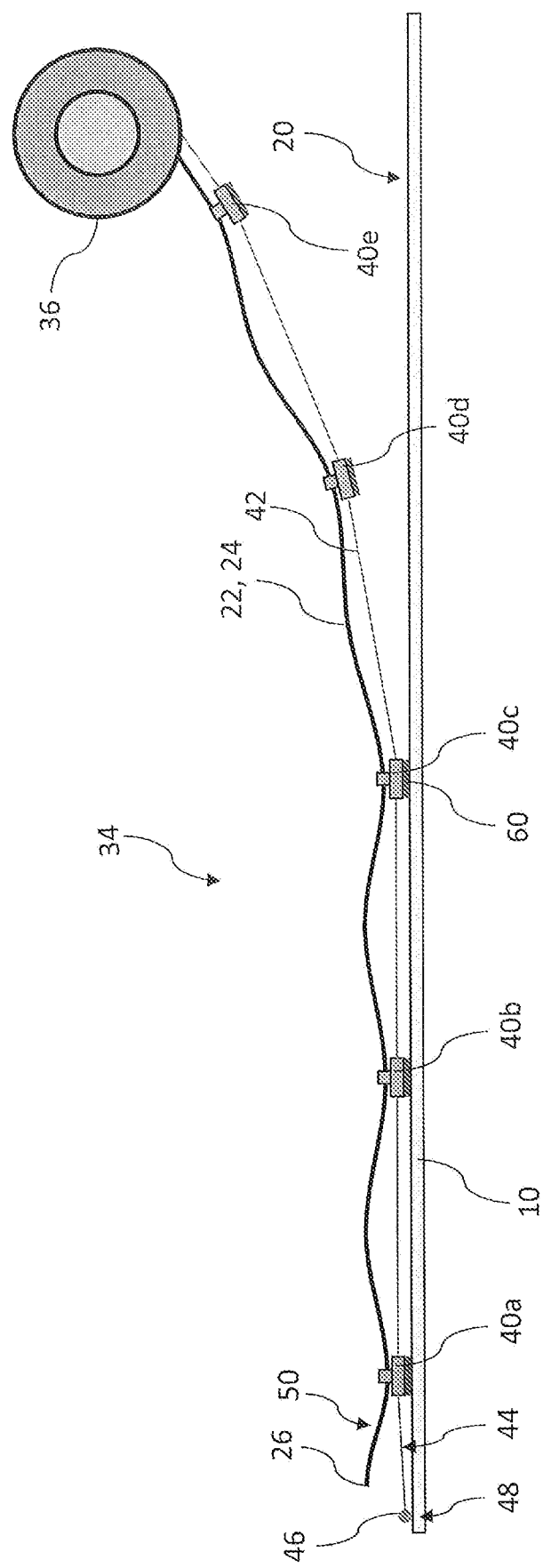
FIG. 2 is a schematic side cross-sectional view of part of the blade of FIG. 1 showing a cable being mounted to an inner surface of the blade shell via a plurality of cable mounts in accordance with an embodiment of the present invention.

FIG. 2 shows a pre-assembled cable assembly 34 being uncoiled from a cable drum 36. The cable assembly 34 comprises the cables 22, 24, a plurality of mounts 40a-e and a tension cord 42. The mounts 40a-e serve to attach the cables 22, 24 to an inner surface 20 of the blade shell 10 and are connected to both the cables 22, 24 and to the tension cord 42 at regular intervals in this example.

The cable assembly 34 comprises the two cables 22, 24 shown in FIG. 1, which form a cable harness. However, for ease of illustration, the pair of cables 22, 24 is illustrated as a single line in FIG. 2. In other examples, the cable assembly 34 may comprise a single cable, or more than two cables. Therefore, references herein to a cable should be interpreted as including references to a single cable and multiple cables, e.g. a cable harness.

As will be appreciated from the following description, the cable assembly 34 enables rapid installation of cables 22, 24 in a wind turbine blade whilst ensuring an appropriate amount of slack is provided in the cables 22, 24. This is achieved by pre-assembling the cable assembly 34 such that the length of each cable 22, 24 between adjacent mounts 40a-e is longer than the length of the tension cord 42 between adjacent mounts 40a-e.

When pre-assembling the cable assembly 34, a spacing distance between adjacent mounts 40a-e is pre-selected. The spacing distance is determined for all pairs of mounts 40a-e that will be spatially adjacent when attached to the blade shell 10. The spacing distance between adjacent mounts 40a-e is defined as the intended distance between a pair of mounts 40a-e when the mounts 40a-e are attached to the blade shell 10. Typically the spacing distance between mounts 40*a-e* will be selected to be between 0.1 m and 1 m, although larger or shorter spacing distances are possible. In the illustrated example, the spacing distance between each pair of mounts 40*a-e* is equal, such that the mounts 40*a-e* are to be evenly spaced-apart, but in other examples unequal spacings between mounts 40*a-e* may be selected if required.

Once the spacing distances between adjacent mounts 40*a-e* have been selected, the mounts 40*a-e* are pre-attached to the tension cord 42 so that the length of tension cord 42 between any two adjacent mounts 40*a-e* is substantially equal to the pre-defined spacing distance. This ensures that, when the tension cord 42 is pulled taut during installation of the cables 22, 24, the mounts 40*a-e* will be spaced with the pre-defined spacing distances between adjacent mounts 40*a-e*.

At a first end 44 of the tension cord 42, which extends beyond a first mount 40*a* of the plurality of mounts 40*a-e*, an attachment device 46 such as an eyelet or a fastener is incorporated for attaching the tension cord 42 to an attachment point 48 defined on the blade shell 10. In other examples, the attachment point 48 may be provided elsewhere, for example it may be defined on a mould tool that supports the blade shell 10, or it may be at another location external from the blade shell 10 and mould.

The tension cord 42 is manufactured from nylon webbing in this example but may be manufactured from other suitable materials. Suitable materials preferably have a high tensile strength and are substantially inextensible, i.e. the material should preferably exhibit minimal elongation under tensile load. A high tensile strength may be desirable to allow the cord 42 to be pulled taut without breaking, while minimal elongation under load ensures minimal deviation of the predefined spacing distances. A degree of flexibility is also desirable to accommodate blade flexing in use if the tension cord is to remain attached to the mounts in the finished blade.

As mentioned above, the cable assembly 34 further comprises a pair of cables 22, 24 attached to the mounts 40*a-e*. The length of the cables 22, 24 between each mount 40*a-e* is also pre-selected when assembling the cable assembly 34 so that a suitable amount of slack is incorporated into the cables 22, 24 between adjacent mounts 40*a-e*. The cables 22, 24 are pre-attached to the mounts 40*a-e* such that the length of each cable 22, 24 between any two adjacent mounts 40*a-e* is equal to the pre-defined spacing between the adjacent mounts 40*a-e* plus a predefined additional length of cable 22, 24 to provide the requisite amount of slack in each cable 22, 24 between the mounts 40*a-e*. Incorporating slack into the cables 22, 24 ensures that, during use, the cables 22, 24 are not strained unnecessarily by flexing of the blade.

As shown in FIG. 2, a first end portion 50 of the cables 22, 24 extends beyond the first mount 40*a*. The first end portion 50 of the cables 22, 24 is of sufficient length to enable the first end 26 of the cables 22, 24 to attach to respective electrical connectors 16, 18 (see FIG. 1) whilst allowing for a requisite amount of slack in the cables 22, 24 between the first mount 40*a* and the respective electrical connectors 16, 18.

Figure 3:
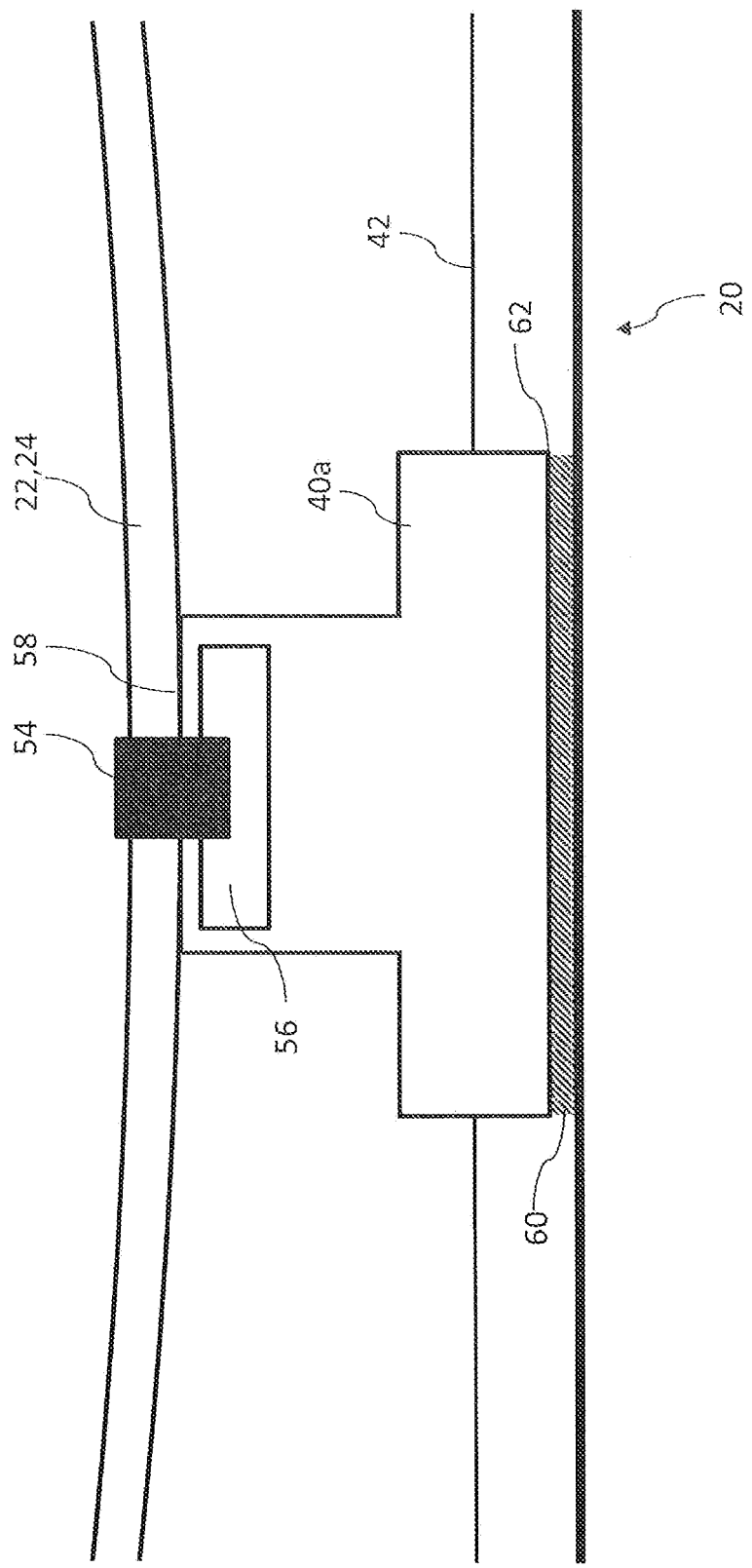
FIG. 3 is a schematic close-up side view of one of the cable mounts shown in FIG. 2.
Figure 4:
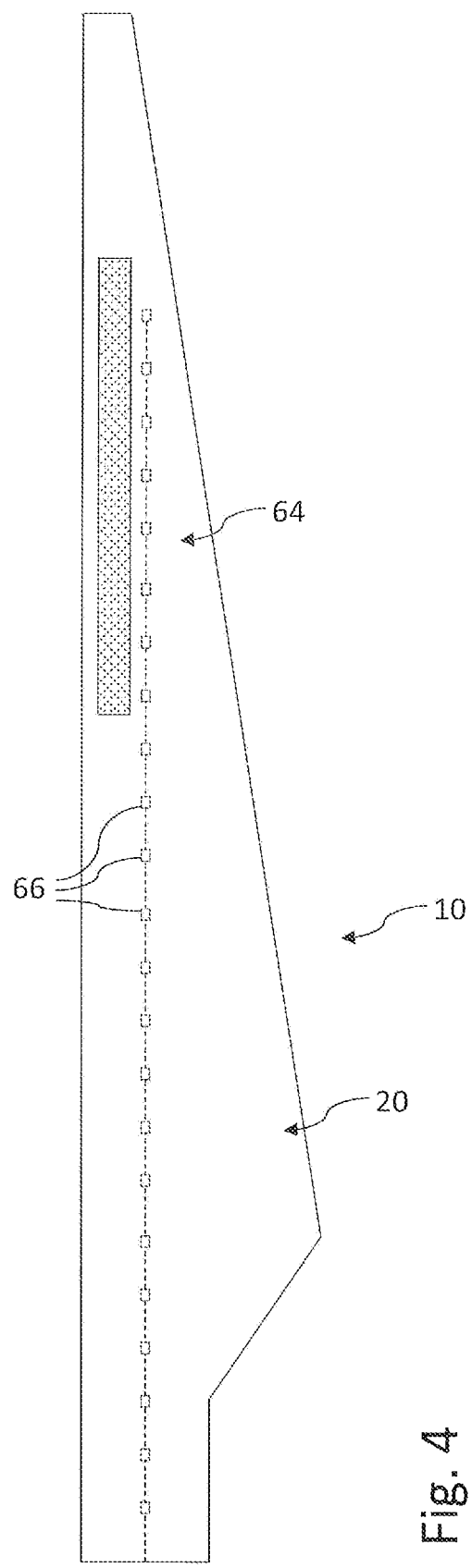
FIG. 4 is a schematic plan view of a wind turbine blade showing a template projected onto the inner surface of the blade shell during installation of cables in accordance with an alternative example of the present invention.

Referring to FIG. 3, the cables 22, 24 in this example are attached to the mount 40*a* by cable ties 54, which pass through an aperture 56 in the mount 40*a* and around the cables 22, 24. The cable tie 54 is secured tightly to prevent movement of the cables 22, 24 relative to the mount 40*a*. The cables 22, 24 are arranged so as to be adjacent an upper face 58 of the mount 40*a*. The tension cord 42 passes through the mount 40*a* and is secured at a point (not shown) inside the mount 40*a*.

It will be appreciated that alternative configurations of the cable assembly 34 to the one shown in FIG. 3 are possible without departing from the scope of the invention as claimed. For example, the cable tie 54 may secure both the cables 22, 24 and the tension cord 42, or the cables 22, 24 and tension cord 42 may pass directly through the mount 40*a*. Whilst a continuous tension cord 42 is shown in this example, in other examples the tension cord 42 may comprise a plurality of individual sections attached respectively between adjacent mounts 40*a*. In such examples, the mounts 40*a* may include attachment means such as eyelets or hooks on each side for securing to the respective sections of the tension cord 42.

Once the cable assembly 34 has been pre-assembled, it is wound around a cable drum 36 (as shown in FIG. 2) to facilitate the subsequent installation of the cable assembly 34 during the blade manufacturing process.

Referring again to FIG. 2, in order to install the cables 22, 24 in the blade, the cable drum 36 with the pre-assembled cable assembly 34 is transported to the blade shell 10 and arranged near the predetermined attachment point 48 defined on the blade shell 10. The fixing device 46 at the first end 44 of the tension cord 42 is attached to the blade shell 10 at the attachment point 48 and the cable drum 34 is then rolled along the blade shell 10 towards the root 30 (see FIG. 1) of the blade to uncoil the cable assembly 34.

Following attachment of the tension cord 42 to the blade shell 10 at the attachment point 48, the first section 44 of the tension cord 42 between the attachment point 48 and the first mount 40*a* is pulled taut, and the first mount 40*a* is secured to the inner surface 20 of the blade shell 10. In this example, the mount 40*a* is bonded to the blade shell 10 by means of adhesive. In particular, and referring also to FIG. 3, a foam pad 60 is pre-bonded to a lower surface 62 of the mount 40*a*, which includes a layer of pressure-sensitive adhesive (not shown) on both sides. A protective tape (not shown) is provided over the pad 60, which is removed immediately prior to bonding the mount 40*a* in place. Alternatively, an epoxy adhesive or polyurethane adhesive may be applied to the lower surface of the mount as an alternative bonding agent.

Each subsequent mount 40*b-e* that follows the first mount 40*a* is fixed to the surface 20 in turn, while tension is maintained in the tension cord 42. By maintaining tension in the cord 42, each mount 40*a-e* is able to be arranged and secured to the blade shell 10 at the predefined spacing distance from its adjacent mounts 40*a-e*. As the length of each cable 22, 24 between each pair of adjacent mounts 40*a-e* is longer than the length of tension cord 42 between adjacent mounts 40*a-e*, pulling the tension cord 42 taut does not stretch or otherwise strain the cables 22, 24. Also, since the cable 22, 24 is firmly secured to the mounts 40*a-e*, the predefined requisite amount of slack in the cables 22, 24 between adjacent mounts 40*a-e* is ensured when the tension cord 42 is pulled taut and the mounts 40*a-e* are secured to the blade shell 10.

Following the fixing of all the mounts 40*a-e* to the inner surface 20 of the blade shell 10, the tension cord 42 may optionally be removed from the assembly 34. For example the cord 42 may be detached from the mounts 40*a-e*. Alternatively, the tension cord 42 may be severed between mounts 40*a-e* so that no tension remains in any section of the tension cord 42. As another alternative, the tension cord 42 may be left in position. In this case, it may be advantageous for the tension cord 42 to have a degree of flexibility to sufficiently accommodate flexing of the blade in use to avoid stresses on the mounts 40*a-e*.

Once the cables 22, 24 have been attached to the blade shell 10, the first end 26, 28 of the cables 22, 24 may be attached to an electrode 16, 18 (shown in FIG. 1). In this example, and other examples in which multiple cables are incorporated into the cable assembly 34, the cables 22, 24 may branch off along the length of the cable assembly 34 and connect to a respective electrode 16, 18.

In another example, a tension cord may be omitted. For example, the cable assembly may comprise at least one cable and a plurality of mounts. In this case, the mounts are attached to the cable with a predetermined spacing between adjacent mounts that is greater than an intended spacing between the mounts when the mounts are attached to the blade shell. This ensures that once the mounts are attached to the blade shell with the intended spacing between mounts, a predefined amount of slack is provided in the cable between adjacent mounts.

In such an example, the method of attaching the cables may involve providing a template on the inner surface of the blade shell. For example, referring to FIG. 4, this shows a template 64 projected using laser projection onto the inner surface 20 of the blade shell 10. The laser-projected template 64 indicates the positions 66 at which the mounts of the cable assembly should be attached to the blade shell 10. The spacings between these positions 66 are slightly less than the length of cable between adjacent mounts, so that when the mounts are attached to the blade shell some slack is incorporated in the cable between adjacent mounts. In other examples, the template 64 may be provided by means other than projection, for example the mounting locations 66 may be marked on the inner surface of the blade shell, e.g. using ink.

The template 64 may equally be used in conjunction with the previous example to conveniently indicate the mounting positions for the respective mounts 40*a-e*.

It should be noted that in the above examples the first mount 40*a* of the cable assembly 34 is installed on the blade shell 10 at or near the electrical connectors 16, 18, while subsequent mounts 40*b*-40*e* are installed in order toward a root end 30 of the shell 10. However, in other examples, the first mount 40*a* may be installed at or near the root end 30 of the blade, and subsequent mounts 40*b*-40*e* installed in order towards the electrical connectors 16, 18. The method may therefore involve uncoiling the cable towards the root of the blade or towards the tip of the blade.

The above examples are provided as non-limiting examples of the invention, and it should be appreciated that many modifications may be made to these examples without departing from the scope of the present invention as defined in the accompanying claims.

The invention claimed is:

1. A method of securing a cable to a wind turbine blade, the method comprising:
   providing a pre-assembled cable assembly comprising a cable and a plurality of mounts pre-attached to the cable at intervals along a length of the cable, the pre-assembled cable assembly defining an electrical path along the cable and the plurality of mounts forming no part of the electrical path; and
   attaching the plurality of mounts to a surface of the wind turbine blade such that the mounts are spaced apart along the surface of the blade;
   wherein the spacing between adjacent mounts when the plurality of mounts are attached to the blade is less than a length of the cable between said adjacent mounts such that a predetermined amount of slack is provided in the cable between said adjacent mounts.

2. The method of claim 1, wherein the pre-assembled cable assembly is coiled on a cable drum and the method comprises uncoiling the pre-assembled cable assembly across the surface of the blade.

3. The method of claim 1, wherein the step of attaching the plurality of mounts to the surface of the blade comprises adhesively bonding the plurality of mounts to the surface of the blade.

4. The method of claim 1, wherein the pre-assembled cable assembly comprises a plurality of cables.

5. A method of securing a cable to a wind turbine blade, the method comprising:
   providing a pre-assembled cable assembly comprising a cable and a plurality of mounts pre-attached to the cable at intervals along a length of the cable; and
   attaching the plurality of mounts to a surface of a wind turbine blade such that the mounts spaced apart along the surface of the blade;
   wherein the spacing between adjacent mounts when the plurality of mounts are attached to the blade is less than a length of the cable between said adjacent mounts such that a predetermined amount of slack is provided in the cable between said adjacent mounts, and
   wherein the pre-assembled cable assembly further comprises a tension cord pre-attached to the plurality of mounts, and a length of the tension cord between adjacent mounts defines the spacing between adjacent mounts and is less than the length of the cable between said adjacent mounts.

6. The method of claim 5, wherein the tension cord comprises a plurality of sections connected respectively between adjacent mounts, and wherein a length of each section is less than the length of the cable between the adjacent mounts.

7. The method of claim 5, wherein the tension cord is substantially inextensible.

8. The method of claim 5, further comprising fixing an end of the tension cord to an attachment point and maintaining tension in the tension cord prior to attaching the plurality of mounts to the surface of the blade.

9. The method of claim 5, further comprising detaching the tension cord from the plurality of mounts and/or severing the tension cord between adjacent mounts after attaching the plurality of mounts to the surface of the blade.

10. The method of claim 1, further comprising providing a template on the surface of the blade indicating a plurality of mounting positions respectively for the plurality of mounts, wherein a spacing between adjacent mounting positions for adjacent mounts is less that than the length of cable between said adjacent mounts.

11. The method of claim 10, wherein the method comprises projecting the template onto the surface of the blade.

* * * * *